Feb. 13, 1951　　　　S. P. ROBINSON　　　　2,541,548
PEBBLE HEATING CHAMBER FOR PEBBLE HEATERS
Filed Aug. 23, 1946
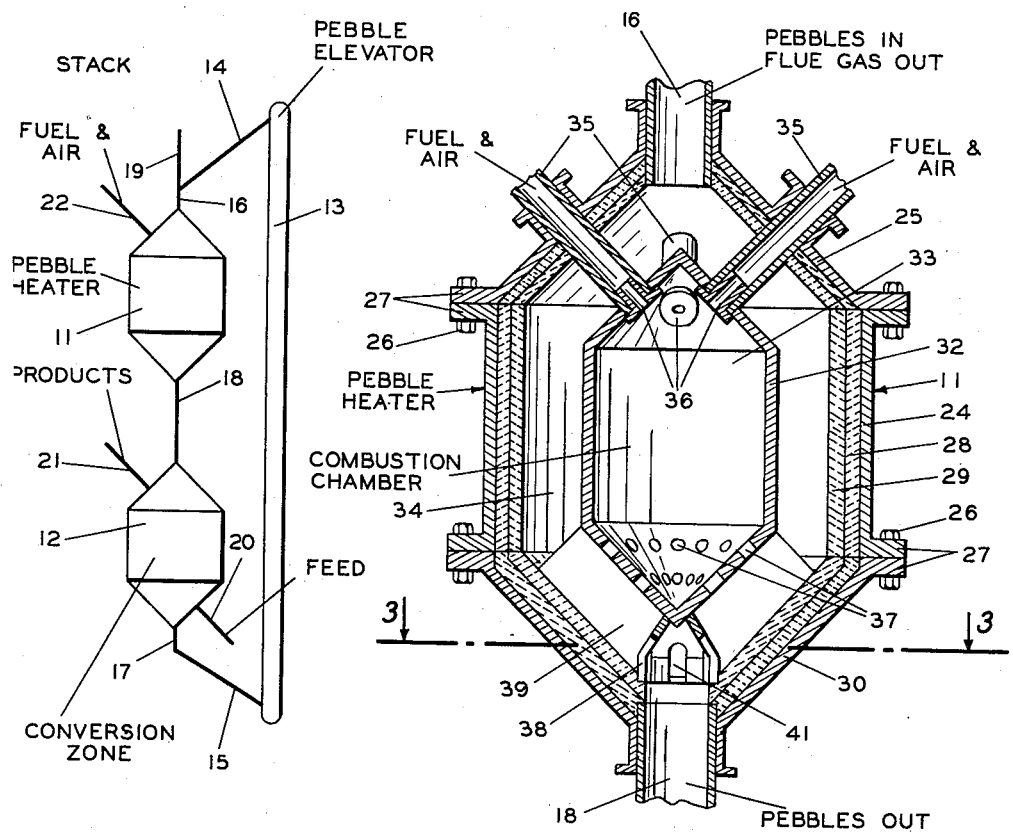
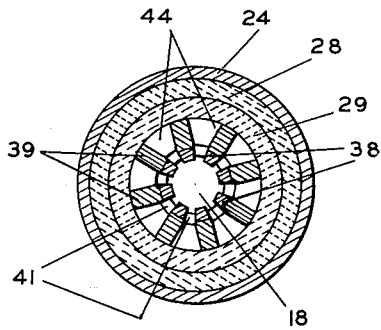
INVENTOR.
S. P. ROBINSON
BY Hudson & Young
ATTORNEYS Patented Feb. 13, 1951

2,541,548

UNITED STATES PATENT OFFICE 2,541,548

PEBBLE HEATING CHAMBER FOR PEBBLE HEATERS

Sam P. Robinson, Bartlesville, Okla., assignor to Phillips Petroleum Company, a corporation of Delaware Application August 23, 1946, Serial No. 692,721

6 Claims. (Cl. 263—19)

This invention pertains to an improved process and apparatus for heating contact materials in the form of pebbles.

The invention is applicable to any gas-solid heat-transfer process which requires contact material heated to high temperature. The solid contact material used may be catalytic or relatively inert in relation to the gas being treated. A principal application of the invention is in the conversion of hydrocarbons involving processes such as thermal and catalytic cracking, hydrogenation, dehydrogenation, isomerization, alkylation, reforming, polymerization, desulfurization, and oxidation of hydrocarbon fractions.

Conventional pebble heater processes with which this invention is most specifically related utilize contact material in the form of a fluent particulate mass of refractory elements called "pebbles." These pebbles are preferably substantially spherical and relatively uniform in size, but may be of irregular shape and size. Spheres of about ⅛ inch to 1 inch in diameter function desirably and those of about ¼ inch to ½ inch are most practical. Care must be taken to select pebbles of proper composition for a given process. In cracking hydrocarbons at elevated temperatures, for example, pebbles of a highly refractory character and ruggedness must be utilized. In conducting endothermic reactions at elevated temperatures it is important to operate with pebbles of relatively high specific heat in order to introduce sufficient heat to the conversion chamber with a minimum flow of pebbles. Pure aluminum pebbles fired at temperatures of between about 3000° and 3500° F. are suitable for hydrocarbon conversion processes. Pebbles comprising beryllia, "Carborundum," mullite, periclase, and zirconia, make excellent contact material for certain processes. Pebbles of the materials above named may be impregnated with other catalytic materials but this treatment usually renders them less suitable catalysts at extremely high temperatures such as 2500° F. and higher. Metals and alloys in the form of balls such as nickel, Monel, inconel, iron, copper, etc. have utility in specific processes.

The conventional pebble heater process entails circulating a mass of pebbles downwardly through a series of chambers or zones, elevating them to a point above the upper chamber, and again allowing them to descend by gravity through the several chambers. The bottoms of the treating chambers are usually conical to aid pebble flow out of the chamber through a relatively narrow neck leading to the succeeding chamber. In hydrocarbon conversion processes pebbles are heated in an upper chamber by contact with a countercurrent stream of flue gas after which they pass into the conversion chamber where they heat the hydrocarbons being processed and supply the heat of reaction required. Since countercurrent flow is the usual practice the lower part of the conversion chamber serves as a preheating zone while the conversion takes place in the upper region of the chamber. A third chamber is sometimes positioned below the conversion zone and utilized for cooling the pebbles before elevation and for heating air or feed gas for the process.

The conventional pebble heating chamber has a relatively large cross section and is fired externally from a furnace adjacent the lower side of the chamber. A relatively narrow column of pebbles enters the top of the chamber and expands to the full diameter of the chamber passing out the bottom of the chamber in a relative narrow passageway. Fuel gas burned in a furnace outside the heater is passed through the conical bottom of the heating chamber into the mass of pebbles and rises through the pebble bed, passing out through an outlet in the upper portion of the chamber.

The present invention provides a pebble heating chamber with a centrally positioned combustion chamber. In operation of this type unit the pebble bed completely surrounds the combustion chamber and offers greater heating efficiency than the conventional type of pebble heater. Hot combustion gas passes out of the bottom of the combustion chamber and rises through a relatively narrow annular bed of descending pebbles, passing out the top of the bed through the pebble inlet. In some cases it may be desirable to pass some or all of the gas out a separate outlet. The ratio of gas distributing area to the cross sectional area of pebbles is far higher than in conventional heater design. This feature allows more uniform distribution of lower velocity gases in the pebble bed and results in better control of heating and more uniform pebble temperatures. With relatively small pebbles this distribution of heating gas practically eliminates channelling of hot gases. The invention provides other material advantages over the externally fired pebble heater. The strain on refractory brick at high temperatures is materially lessened. No insulation is needed to keep down heat losses through the walls of the combustion chamber. Lower temperature gradients between inside and outside walls of combustion chamber insure long refractory life. Construction of refractory brick gas distributing shapes is simpler and these shapes can be built to operate under more uniform loads with less temperature shock. Moreover, the space requirement for pebble heater installation is less than the amount taken up by the separate combustion chamber, auxiliary controls, and connecting duct work necessary in conventional installations at the present time. Another advantage provided is the pebble tempering period between the time the pebbles leave the space beneath the combustion gas outlet and enter the outlet conduit at the bottom of the chamber.

An object of the present invention is to provide an improved process and apparatus for heating pebbles. Another object is to provide better control in the heating of pebbles in large chambers. It is also an object of this invention to provide cheaper construction and greater heat economy in pebble heater design. A further object of the invention is to provide better and cheaper refractory construction. It is also an object of the invention to provide more uniform pebble flow through a pebble heating chamber.

A number of modifications of the invention are feasible. The cross sectional shape of the combustion chamber and/or pebble heating chamber may be circular, square, rectangular, hexagonal, octagonal or any desired regular shape. However, the circular shape is preferred. The internal combustion chamber can be supported in any number of ways known to the art. While a centrally or axially located pebble inlet is preferred, pebbles may be admitted to the heating chamber through an inlet not centrally positioned. Flue gas may be removed through a single or a plurality of separate outlets in the top of the pebble heating chamber. Firing in the combustion chamber may be vertically downward, oblique as shown, tangentially, and/or laterally fired with one or a plurality of burners. Various arrangements of refractory supports under the combustion chamber are feasible. Instead of the frusto-conical annular member shown, a cylindrical member may be used under the combustion chamber. Likewise, the apex of the conical bottom of the combustion chamber may be dome shaped to provide a better tempering period for the pebbles.

For a more complete understanding of the invention, reference may be had to the drawing of which Figure 1 is a diagrammatic showing of an arrangement of pebble heater apparatus. Figure 2 shows a sectional elevation of the pebble heating chamber according to the invention. Figure 3 is a section on the line 3—3 of Figure 2.

To describe a representative process according to the invention, a combustible mixture of fuel and air is fed in through burners 22 to an internal combustion zone (not shown) in pebble heating chamber 11. Hot combustion gas flows upwardly through a bed of pebbles in chamber 11 and out through pebble inlet 16 and stack 19. The hot stream of pebbles descends into chamber 12 through neck 18 and there heats hydrocarbon feed admitted through line 20 which feed then passes upwardly through the hot pebble bed and out line 21. As the pebbles descend through conversion chamber 12 they are considerably cooled before they pass out through line 17 and chute 15 into elevator 13; so they are elevated to chute 14 which again permits them to descend through the pebble heater 11, neck 18 and conversion zone 12 to repeat the cycle.

Referring more in detail to Figure 2, 11 is a pebble heater unit having a main shell 24, a conical top shell 25 and conical bottom shell 30. The sections of the shell are bolted together by bolts 26 through flanges 27. The chamber is completely lined with an insulating layer 28 and a refractory lining 29. Combustion chamber 33 inclosed by wall 32 of substantially the same shape as heater 11 and axially positioned within the heater provides pebble passageway 34 completely surrounding the combustion zone. A series of burners 35 introduce a mixture of fuel and air which is burned in combustion zone 33. The tubes of burner 35 may be made of high temperature alloy such as inconel, and tipped with a refractory ceramic material 36. Holes or slots 37 conduct hot combustion gas out of the combustion zone into the pebble passageways below the combustion chamber. Combustion chamber walls 32 may be made of any refractory material which will withstand the severe temperature conditions prevailing in the pebble heater.

Combustion chamber 33 is supported by refractory cone 38 and refractory supports 39 which extend outwardly therefrom radially. Any number of refractory supports 39 may be utilized which will support the combustion chamber and still provide sufficient space for passage of pebbles between the refractories. A number of slots or passageways 41 in cone 38 to correspond to the number of pebble passageways between refractories 39 is provided. Numerals 16 and 18 indicate a pebble inlet and outlet respectively.

Due to the high temperatures frequently involved, lining 29, combustion chamber wall 32, and the refractory supports 38 and 39 are preferably made of aluminum oxide although they may be made of silicon carbide. For more stable construction use may be made of tongued-and-grooved brick in the wall construction.

In constructing the unit the size and position of combustion chamber 33 should be regulated so that a rather uniform pebble passageway 34 is provided. This feature of the invention insures more careful control of temperatures of the pebbles and more uniform pebble flow through the heater.

Figure 3 shows more clearly the refractory support means under combustion chamber 33. Pillars of the annular support 38 are shown. Refractory supports 39 and pillars 38 are spaced to provide for passageways 44 and 41, respectively, which lead into pebble outlet 18. Numerals 24, 28, and 29, designate the shell, insulating material, and refractories, respectively.

In operating according to the invention a continuous mass of pebbles flows through inlet 16, filling passageway 34, completely surrounding combustion chamber 33, and passing out through pebble outlet 18. A combustible gas mixture injected through burners 35 and burned in combustion chamber 33 passes out through slots 37 into passageway 44 (shown in Figure 3) and passes upwardly through the descending mass of pebbles in passageway 34 and out through pebble inlet 16 and stack 19 (shown in Figure 1).

While the above described invention has particular utility in hydrocarbon conversion processes it is not so limited and may be used for heating any kind of contact material required to heat any type of gas to a high temperature.

Other modifications of the invention than those described will become apparent to those skilled in the art. The illustrative details disclosed are not to be construed as imposing unnecessary limitations on the invention.

I claim:

1. Apparatus for heating pebbles in a flowing stream which comprises a substantially vertical vessel closed on either end and enclosing a single centrally positioned walled combustion chamber surrounded by an adjacent pebble passageway on all sides including the top and bottom, support means for such combustion chamber, conduit means for introducing a combustible gas mixture into said combustion chamber, means for passing combustion gas from the lower portion of said combustion chamber into said pebble passageway, gas outlet means in the upper portion of said vessel, pebble inlet means in the upper portion of said vessel positioned directly above said combustion chamber, and pebble outlet means in the lower portion of said vessel.

2. Apparatus for heating pebbles in a flowing stream which comprises a substantially vertical vessel closed on either end by outwardly-extending pyramidal end walls and enclosing a single centrally positioned walled combustion chamber fixed in spaced-apart relation to the walls and end closure members of said vessel thereby providing an adjacent pebble passageway completely surrounding said combustion chamber, support means for said chamber, conduit means for introducing a combustible gas into said chamber, openings in the bottom of said chamber for passage of combustion gas therefrom, outlet means in the upper portion of said vessel for removal of combustion gas, pebble inlet means in the upper portion of said vessel positioned directly above said combustion chamber, and pebble outlet means in the lower portion of said vessel.

3. Apparatus for heating a moving stream of pebbles which comprises a cylindrical vertical vessel having convex conical end walls terminating in pebble inlet and outlet conduits at the apexes of the upper and lower end walls, respectively; an axially positioned combustion chamber having the shape of said vessel but considerably smaller in size and supported within said vessel so as to provide a uniform pebble passageway completely around said chamber; means for introducing combustible gas into said chamber through said upper conical end wall; openings in the lower conical end wall of said chamber for passing combustion gas into said pebble passageway; and outlet means in the upper portion of said vessel for removing combustion gas from said pebble passage.

4. Apparatus for heating a moving stream of pebbles which comprises a substantially cylindrical vertical vessel having convex conical end walls terminating in pebble inlet and outlet conduits at the apexes of the upper and lower end walls, respectively; a substantially axially positioned combustion chamber having substantially the same shape as said vessel but considerably smaller in size and supported within said vessel so as to provide a substantially uniform pebble passageway completely around said chamber; means for supporting said chamber comprising an annular member axially positioned and a series of radially positioned members spaced-apart and extending outwardly from said annular member, thereby forming pebble passageways between the bottoms of said vessel and said chamber, said annular member having openings therein in communication with said pebble passageways providing for flow of pebbles into said pebble outlet conduit.

5. Apparatus of claim 3 in which means for introducing combustible gas to said chamber comprises a plurality of burner tubes extending through the conical upper ends of said vessel and said chamber.

6. Apparatus for heating a gravitating bed of pebbles, comprising in combination a vertically elongated vessel having enclosing walls and top and bottom closure members; pebble inlet means in the top closure member; pebble outlet means in the bottom closure member; a single centrally positioned vertically elongated walled combustion chamber within said vessel of considerably smaller size than said vessel and supported in spaced-apart relation thereto at all points so as to form a pebble passageway both laterally and longitudinally around said chamber; conduit means extending from exteriorly of said vessel to the interior of said combustion chamber for introducing a combustible gas mixture thereto; a gas outlet in the upper section of said vessel; and outlet means in the lower end of said combustion chamber.

SAM P. ROBINSON.

REFERENCES CITED

The following references are of record in the file of this patent:

UNITED STATES PATENTS

| Number | Name | Date |
|---|---|---|
| 512,547 | Harmon | Jan. 8, 1894 |
| 1,669,012 | Nordstrom | May 8, 1928 |
| 2,201,738 | Neve | May 21, 1940 |
| 2,432,503 | Bergstrom | Dec. 16, 1947 |